United States Patent

[11] 3,624,484

[72] Inventor John E. Colyer
Longueville, New South Wales, Australia
[21] Appl. No. 881,901
[22] Filed Dec. 3, 1969
[45] Patented Nov. 30, 1971
[73] Assignee The Wellcome Foundation Limited, Incorporated
London, England
[32] Priority Dec. 13, 1968
[33] Australia
[31] 47786/68

[54] OSCILLATOR OUTPUT CIRCUIT CONFIGURATION
11 Claims, 2 Drawing Figs.

[52] U.S. Cl. .......... 321/2, 128/422, 315/135, 321/16, 331/112
[51] Int. Cl. .......... H02m 3/32, A61On
[50] Field of Search .......... 321/2, 16; 128/422, 423, 21; 331/112; 315/221, 225, 135, 129

[56] References Cited
UNITED STATES PATENTS
2,881,382 4/1959 Amato .......... 321/16
3,375,402 3/1968 Houghton .......... 315/129 X
3,393,279 7/1968 Flanagan .......... 128/422
FOREIGN PATENTS
594,701 6/1959 Italy .......... 321/2
OTHER REFERENCES
" Medical & Biological Engineering," Vol. 6, No. 4, pp. 445, 446 Aug. 1968.

*Primary Examiner*—William H. Beha, Jr.
*Attorney*—Holman & Stern

ABSTRACT: A circuit configuration and an electronic locator/stimulator device for medical purposes incorporating said circuit configuration in which a first pulse component of an output signal, which is clipped to a predetermined voltage amplitude, is impressed across load terminals of the circuit while a second pulse component of the output signal appears across a gas discharge indicator lamp.

PATENTED NOV 30 1971

3,624,484

John Ernest George Colyer
Inventor

By Holman Glascock
Downing & Seebold
Attorney

OSCILLATOR OUTPUT CIRCUIT CONFIGURATION

This invention relates to an improved electronic oscillator circuit and, more particularly, to an output circuit configuration for such oscillator.

The invention also relates to an electronic nerve locator/stimulator which embodies an oscillator incorporating said output circuit configuration.

The purpose of an electronic nerve locator/stimulator is, inter alia, to locate (by the use of suitable needle electrodes) the position of a particular nerve which is disposed below the skin and tissue of a patient, and to identify that nerve (by the application of electrical stimulus) so that, by the adoption of nerve block procedures, the nerve may be rendered inoperative. Another purpose of the locator/stimulator is to locate and identify (by electrical stimulation a nerve which has been exposed during surgery.

For the above purposes, the locator/stimulator should be capable of producing:

a. pulses in a "Tetanus" mode, at a rate of approximately 30 pulses per second, b. pulses in a "Normal" mode, at a rate of one pulse per 2 seconds—(the initial pulse in this mode should, for the convenience of an anaesthetist, occur at the instant of selection in order to permit "single shot" operation), c. an output voltage existing over the approximate range of to at least 30 volts to permit sensitive and accurate location of a particular nerve, d. an output pulse (or pulses) of square waveform having a fast rise time, no overshoot and a width sufficient to overcome any existing indirect blockage of a neuromuscular junction; and e. a visible indication of individual pulse outputs.

The actual desired pulse repetition rate, pulse size and pulse shape are all functions of the oscillator circuit configuration and may be obtained by the use of an oscillator of the general type described in the applicant's copending application No. 32043/68. However, as above mentioned, it is desirable that visual indication be give at each pulse output and (by virtue of a necessity for power economy) this presupposes the provision of a gas discharge lamp, which requires a comparatively high operating voltage. Also, as above mentioned the output should be a square wave of comparatively low voltage. These, apparently, incompatible requirements are met by the provision of an output circuit configuration as below defined.

Thus, the present invention provides an oscillator in circuit with a power supply and a primary winding of a transformer, and an output circuit connected across a secondary winding of said transformer; said output circuit comprising a gas discharge lamp connected across said secondary winding and in series with a pair of load terminals, a forward conducting rectifier means connected across said gas discharge lamp, and a reference voltage rectifier means reverse connected in circuit with the first-mentioned rectifier means and across said load terminals.

The invention further provides an electronic nerve locator/stimulator comprising a power supply, a transistorized oscillator circuit including at least one transistor in circuit with a resistance-capacitance timing network, the effective impedance of which is variable to provide a desired output pulse repetition rate, a transformer having a primary winding or windings in circuit with said oscillator, and an output circuit from which an output pulse may be obtained connected across a secondary winding of the transformer; said output circuit comprising a gas discharge lamp connected across said secondary winding and in series with a pair of load terminals, a forward conducting rectifier means connected across said gas discharge lamp, and a reference voltage rectifier means reverse connected in circuit with the first-mentioned rectifier means and across said load terminals.

There is more particularly provided in accordance with the present invention a nerve locator/stimulator comprising a power supply, an oscillator circuit including a single transistor in circuit with a resistance capacitance timing network, the effective impedance of which is variable to provide a desired output pulse repetition rate, a transformer, said transformer having a first primary winding in circuit with the collector of the transistor and a second primary winding in circuit with the base of the transistor and through which a reflected current is passed by way of a positive feedback loop to said transistor base; and an output circuit from which an output pulse may be obtained connected across a secondary winding of the transformer, said output circuit comprising a gas discharge lamp connected across said secondary winding and in series with a pair of load terminals, a forward conducting diode connected across said gas discharge lamp, and a zener diode reverse connected in circuit with the first mentioned diode and across said load terminals, whereby a first pulse component of the output signal will appear across said load terminals, the voltage level of the output pulse being limited by the breakdown voltage of the zener diode, and a second pulse component of the output signal will appear across said gas discharge lamp.

The invention will be more fully understood from the following description of a preferred embodiment thereof taken in conjunction with the accompanying drawing.

In the drawing

Figures 1, 2:
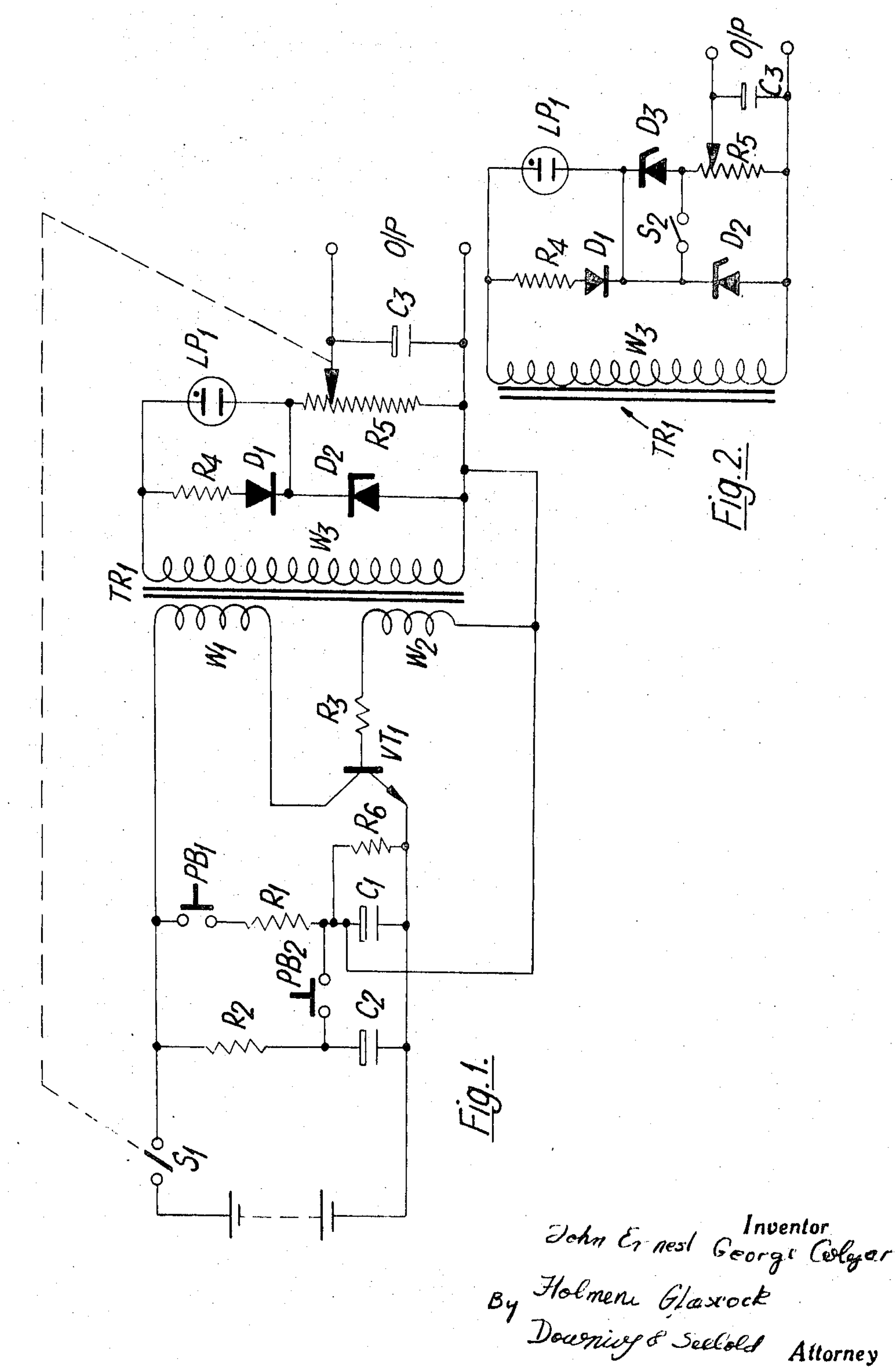
FIG. 1 shows a circuit diagram of a nerve locator/stimulator device.
FIG. 2 shows a modified output circuit arrangement for the device of FIG. 1.

From the drawing, the device generally comprises a power supply, an oscillator circuit employing a single transistor $VT_1$ in conjunction with a pulse transformer $TR_1$ the pulse repetition rate of which is controlled by an R-C network, and an output circuit connected to the secondary winding of the transformer.

The fundamental operation of the circuit is based on a modified "blocking oscillator." The timing capacitor $C_1$ (or capacitor network $C_1+C_2$) initially has zero voltage across it but charges through the timing resistor $R_1$ (or resistor network $R_1+R_2$) until such time as the voltage across $C_1$ (or $C_1+C_2$) exceeds the base-emitter forward conduction voltage of the transistor $VT_1$. The transistor base then conducts and collector current is drawn through the winding $W_1$ of the transformer $TR_1$. The current through winding $W_1$ is reflected into winding $W_2$ and, through positive feedback, turns the transistor "on" hard. This gives a short rise time to the base, and therefore collector current pulse.

The additional base bias supplied from the reflected pulse permits the base current to discharge the capacitor $C_1$ (or $C_1+C_2$) to a very low level. Base current is desirably limited to a safe value by introduction of a series limiting resistor $R_3$.

After the pulse from the collector circuit has decayed, transistor $VT_1$ is cut off, since the voltage across $C_1$ (or $C_1+C_2$ ) again approaches zero, and the circuit can no longer ring. One pulse only is thus initially generated.

The cycle then repeats as the capacitor network charges through the resistance network, a train of single pulses being generated by the circuit for as long as the power supply is "-switched on," in this case by switch $S_1$ ganged to potentiometer $R_5$, hereinafter referred to.

The pulse repetition rate is dependent upon the time constant of the R.C. network, this, as shown in the drawing, being made variable by the capacitor switching arrangement comprising pushbuttons $PB_1$ and $PB_2$.

On operation, depressing pushbuttons $PB_1$ permits capacitor $C_1$ to charge through resistor $R_1$ until the firing point of the transistor is reached. By holding the pushbutton in the depressed position a pulse repetition rate proportional to the time constant of the $R_1$–$C_1$ network will be maintained.

Then, by depressing pushbutton $PB_2$, capacitor $C_2$, by being connected across the battery through resistor $R_2$ is in a charged condition, shares its charge with capacitor $C_1$ and raises the voltage sufficiently to cause the transistor $VT_1$ to fire instantaneously. The transistor will then continue to fire at a repetition rate determined by the time constant of the $R_2.(C_1+C_2)$ network for as long as pushbutton $PB_2$ is kept depressed. Capacitor $C_2$ however has a very small value (in the order of 1 percent) compared with that of $C_1$ and this thus provides an effective time constant (with $PB_2$ depressed) of $R_2.C_1$.

Since capacitor $C_2$ will charge rapidly through resistor $R_2$ when pushbutton $PB_2$ is released, repetitive operation of pushbutton $PB_2$ will result in single pulses responsive to each depression. The circuit thus combines the function of "single shot" and repetitive pulsing.

To facilitate improved operation of the circuit above described, a resistor $R_6$ is shunted across capacitor $C_1$ to stabilize the firing point of transistor $VT_1$ and to compensate for variation in the capacitance of capacitor $C_1$.

The collector current pulse in winding $W_1$ is also reflected into the secondary winding $W_3$ and across which a high voltage pulse is developed, the value of which is determined by the primary to secondary winding ratio and which will be sufficient to cause a gas discharge lamp $LP_1$ to light.

With reference now to the input circuit of FIG. 1; during the initial positive portion of the transformer output pulse (which preferably has a square waveform) diode $D_1$ conducts and the whole of the pulse appears across the voltage control potentiometer $R_5$, which is in parallel with a zener diode $D_2$. Zener diode $D_2$ is selected to break down in the zener mode at a desired upper voltage level and a resistor $R_4$ is inserted in series with both diodes to act as a current limiter. Thus, the voltage across potentiometer $R_5$ is limited to the breakdown voltage of diode $D_2$ and is clipped as a square wave. Also, since the voltage across $D_1$ and $R_4$ will be low, the gas discharge lamp $LP_1$ will not light. Then, during the negative portion of the pulse, diode $D_2$ will conduct in the forward direction whilst diode $D_1$ "blocks" such that a small voltage appears across potentiometer $R_5$, and the majority of the pulse appears across the lamp $LP_1$. By this means, a square pulse is obtained out the output terminals and, at the same time, the lamp is ignited during each successive pulse.

With reference to FIG. 2, there is shown an output circuit configuration which permits the selection of either one of two output voltages. In this case a further zener diode $D_3$ is inserted in series with the diode $D_1$ and the potentiometer $R_5$, the diode $D_3$ being adapted to be shorted out by a switch $S_2$.

When diode $D_3$ is shorted by the switch $S_2$, the output voltage is that of diode $D_2$, as above. However, when the switch $S_2$ is opened, the output voltage will be a difference voltage between the two zener diodes ($V_{D2}-V_{D3}$). Any small "-switching" spikes which may occur with this configuration may be eliminated by connecting capacitor $C_3$ across the output terminals.

Many modifications may be made in the circuit as described above and as illustrated without departing from the scope of the invention. However, the following are given by way of exemplification as components and component values which may be employed to construct such a device, the elements referred to being those shown in FIG. 1 of the drawing:

| | |
|---|---|
| Battery, | 6-volt (4×1.5 volt pencil cells) |
| Resistor $R_1$, | 2.2 K ohms |
| Resistor $R_2$, | 120 K ohms |
| Resistor $R_3$, | 22 ohms |
| Resistor $R_4$, | 2.2 K ohms |
| Potentiometer $R_5$, | 25 K ohms, linear |
| Resistor $R_6$, | 100 K ohms |
| Capacitor $C_1$, | 200 microfarads |
| Capacitor $C_2$, | 2 microfarads |
| Capacitor $C_3$, | 470 picofarads |
| Diode $D_1$, | BY 126 |
| Diode $D_2$, | IN 972 |
| Transistor $VT_1$, | Silicon NPN type AS310 |
| Transformer $TR_1$, | "Ferguson" type TSW112 |

With the various discussed compounds having values as above indicated, the following results have been found obtainable:

| | |
|---|---|
| a. Output voltage | 0 to 30 volts (max.) |
| b. Pulse width | 4 milliSecs. (max.) |
| c. Pulse energy | 0.8 milliJoules (max.) |
| d. Pulse repetition rate | 30 pulses/second ($PB_1$ depressed) 1 pulse/2 seconds ($PB_2$ depressed) |

By selecting an appropriate zener diode $D_3$, a desired output voltage scale range may be achieved. For example, if diode $D_3$ was selected to break down in the zener mode at 24 volts, with switch $S_2$ opened a maximum output voltage of (30–24)=6 may be obtained.

A container for the components afore described may be formed of any suitable plastic material, the cover therefore being apertured to permit the mounting or external projection of the lamp $LP_1$, switch $S_2$, pushbuttons $PB_1$ and $PB_2$ and a control knob for the ganged potentiometer/switch $S_1$. The cover may additionally be marked with suitable indicia and the container apertured to take a connectable probe or electrode lead plug.

Electrodes for use in conjunction with the device above described may take the form of needle electrodes or probes.

What is claimed is:

1. An oscillator in circuit with a power supply and a primary winding of a transformer, and an output circuit connected across a secondary winding of said transformer; said output circuit comprising a gas discharge lamp connected across said secondary winding and in series with a pair of load terminals, a forward conducting rectifier means connected across said gas discharge lamp, and a reference voltage rectifier means reverse connected in circuit with the first-mentioned rectifier means and across said load terminals.

2. In a circuit configuration comprising an oscillator in circuit with a power supply and a primary winding of a transformer, and an output circuit connected across a secondary winding of said transformer; said output circuit comprising a gas discharge lamp connected across said secondary winding and in series with a pair of load terminals, a forward conducting diode connected across said gas discharge lamp, and a zener diode reverse connected in circuit with the first-mentioned diode and across said load terminals, whereby a first pulse component of the output signal appears across said load terminals, the voltage level of the output pulse being limited by the breakdown voltage of the zener diode, and a second pulse component of the output signal appears across said gas discharge lamp.

3. The circuit configuration as claimed in claim 2 including a second zener diode connected in series through a switching device with the first-mentioned zener diode whereby the output pulse voltage level is, with the switch open, a difference voltage between that of the first and second zener diodes.

4. The circuit configuration as claimed in claim 2 including a linear voltage control potentiometer connected across said load terminals.

5. The circuit configuration as claimed in claim 2 wherein the output pulse is clipped by the zener diode as an approximately square wave.

6. A nerve locator/stimulator comprising a power supply, a transistorized oscillator circuit including at least one transistor in circuit with a resistance-capacitance timing network, the effect impedance of which is variable to provide a selected output pulse repetition rate, a transformer having at least one primary winding in circuit with said oscillator, and an output circuit from which an output pulse is obtained connected across a secondary winding of the transformer; said output circuit comprising a gas discharge lamp connected across said secondary winding and in series with a pair of load terminals, a forward conducting rectifier means connected across said gas discharge lamp, and a reference voltage rectifier means reverse connected in circuit with the first-mentioned rectifier means and across said load terminals.

7. A nerve locator/stimulator comprising a power supply; an oscillator circuit including a single transistor in circuit with a resistance capacitance timing network, the effective impedance of which is variable to provide a selected output pulse repetition rate; a transformer, said transformer having a first primary winding in circuit with the collector of the transistor and a second primary winding in circuit with the base of the transistor, and through which a reflected current is passed by way of a positive feedback loop to said transistor base; and an output circuit from which an output pulse is obtained connected across a secondary winding of the transformer, said output circuit comprising a gas discharge lamp connected across said secondary winding an in series with a pair of load terminals, a forward conducting diode connected across said gas discharge lamp, and a zener diode reverse connected in circuit with the first-mentioned diode and across said load terminals, whereby a first pulse component of the output signal appears across said load terminals, the voltage level of the output pulse being limited by the breakdown voltage of the zener diode, and a second pulse component of the output signal appears across said gas discharge lamp.

8. A nerve locator/stimulator as claimed in claim 7 wherein there is a second zener diode connected in series, through a switching device, with the first mentioned zener diode whereby the output pulse voltage level is selectable at two levels, said voltage level being, with the switch open, a difference voltage between that of the first and second zener diodes.

9. A nerve locator/stimulator as claimed in claim 7 wherein there is a linear voltage control potentiometer connected across said load terminals.

10. A nerve locator/stimulator as claimed in claim 7 wherein said output pulse is clipped by the zener diode as an approximately square wave.

11. A nerve locator/stimulator as claimed in claim 7 wherein the impedance value of said timing network is variable by switching at least one capacitor component thereof into or out of circuit with the base-emitter electrodes of the transistor.

* * * * *

Disclaimer 3,624,484.—*John E. Colyer*, Longueville, New South Wales, Australia. OSCILLATOR OUTPUT CIRCUIT CONFIGURATION. Patent dated Nov. 30, 1971. Disclaimer filed Apr. 21, 1978, by the assignee, *Burroughs Wellcome Co.*

Hereby enters this disclaimer to all claims of said patent.

[*Official Gazette June 13, 1978.*]